US 6,695,561 B2

(12) United States Patent
Barry

(10) Patent No.: US 6,695,561 B2
(45) Date of Patent: Feb. 24, 2004

(54) CONTAINER DRIVE-BY-TRANSFER AND SYSTEM

(76) Inventor: Leonard D. Barry, 19300 Pennington Dr., Detroit, MI (US) 48221

( * ) Notice: Subject to any disclaimer, the term of this patent is extended or adjusted under 35 U.S.C. 154(b) by 164 days.

(21) Appl. No.: 09/953,987

(22) Filed: Sep. 17, 2001

(65) Prior Publication Data

US 2002/0044858 A1 Apr. 18, 2002

Related U.S. Application Data

(63) Continuation-in-part of application No. PCT/US00/03400, filed on Feb. 9, 2000.
(60) Provisional application No. 60/278,224, filed on Mar. 23, 2001, and provisional application No. 60/233,186, filed on Sep. 15, 2000.

(51) Int. Cl.⁷ .......................... B65G 63/00; B65G 63/02
(52) U.S. Cl. .................... 414/337; 414/333; 414/338; 414/339; 414/343
(58) Field of Search ........................ 414/333, 392, 414/334, 343, 337, 338, 339; 104/20

(56) References Cited

U.S. PATENT DOCUMENTS

| | | | |
|---|---|---|---|
| 1,313,091 A | | 8/1919 | Lamar |
| 1,383,220 A | | 6/1921 | Lamar |
| 3,028,023 A | * | 4/1962 | Eckersall ............ 414/343 |
| 3,471,043 A | | 10/1969 | Kemp et al. |
| 3,548,756 A | | 12/1970 | Fujioka |
| 3,991,889 A | * | 11/1976 | Cox .................... 414/339 |
| 4,065,006 A | * | 12/1977 | Barry .................. 414/334 |
| 4,082,042 A | * | 4/1978 | Barry .................. 104/18 |
| 4,124,129 A | | 11/1978 | Barry |
| 4,130,208 A | | 12/1978 | Barry |

FOREIGN PATENT DOCUMENTS

| CA | 678706 | * 1/1964 | ................. 414/337 |
|---|---|---|---|

* cited by examiner

*Primary Examiner*—Steven A. Bratlie
(74) *Attorney, Agent, or Firm*—Gifford, Krass, Groh, Sprinkle, Anderson & Citkowski, PC

(57) ABSTRACT

A dock or railway has a length of parallel track-driveway spaced along side for rail mounted tractor-trailers or truck-bus chassis-cab to guide on and travel to transfer cargo or people containers between the dock or cars in a train stopped for these transfers. The truck bed, chassis, or dock has one or more parallel oblique channels extensible or with roller bars extensible obliquely from a side to engage transfer rollers added on the container or oblique channels in the bottom of the container to move the container between the truck bed and the dock or car according to the direction the truck is driven or moved along parallel past the dock or car or the container is extended to initiate transfer. Various actuators can initiate and complete the transfer between the truck and standing train car or dock. Passenger and freight containers are interchangeable on the same bus-truck chassis and railway car container berth. Accumulating conveyors can carry the containers side-by-side to and from the transfer platform, which can be on a ship dock crane. Standard ISO containers can be handled without modification.

15 Claims, 7 Drawing Sheets

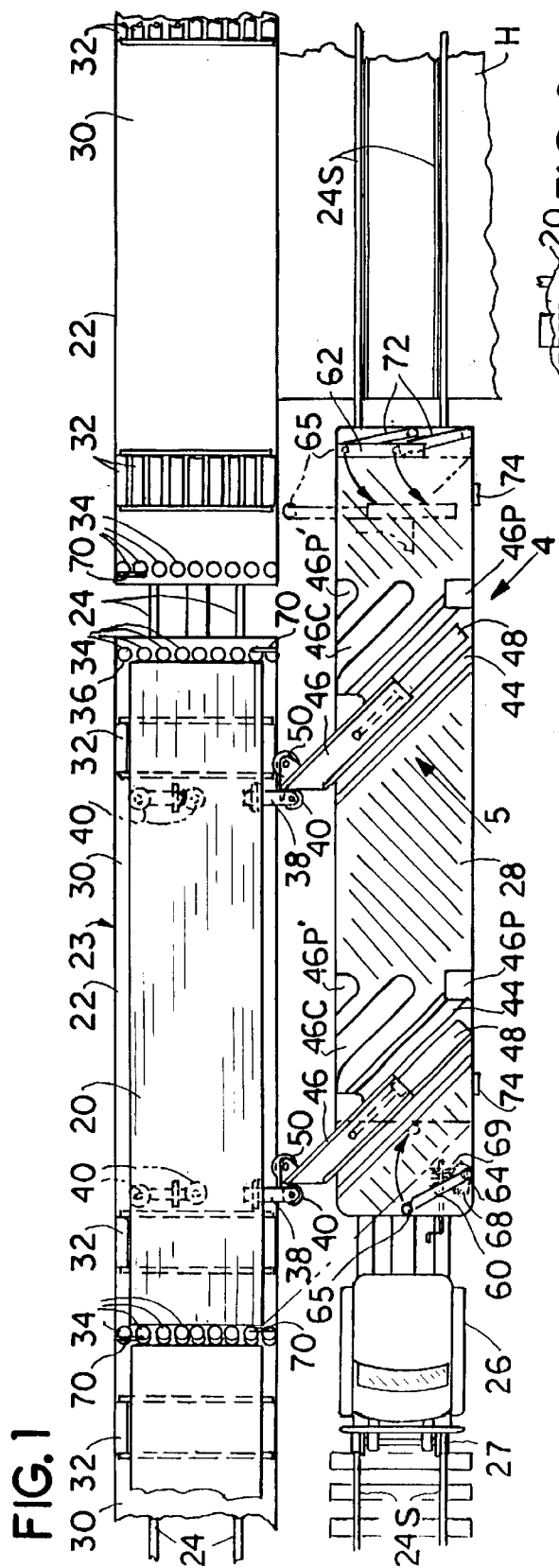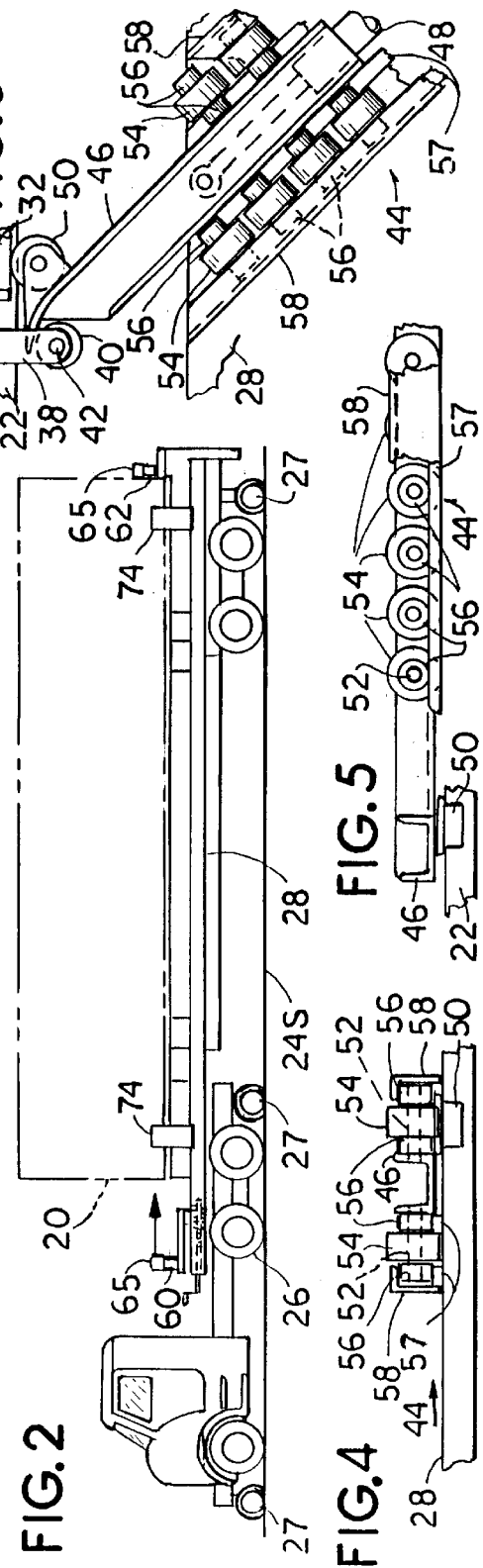

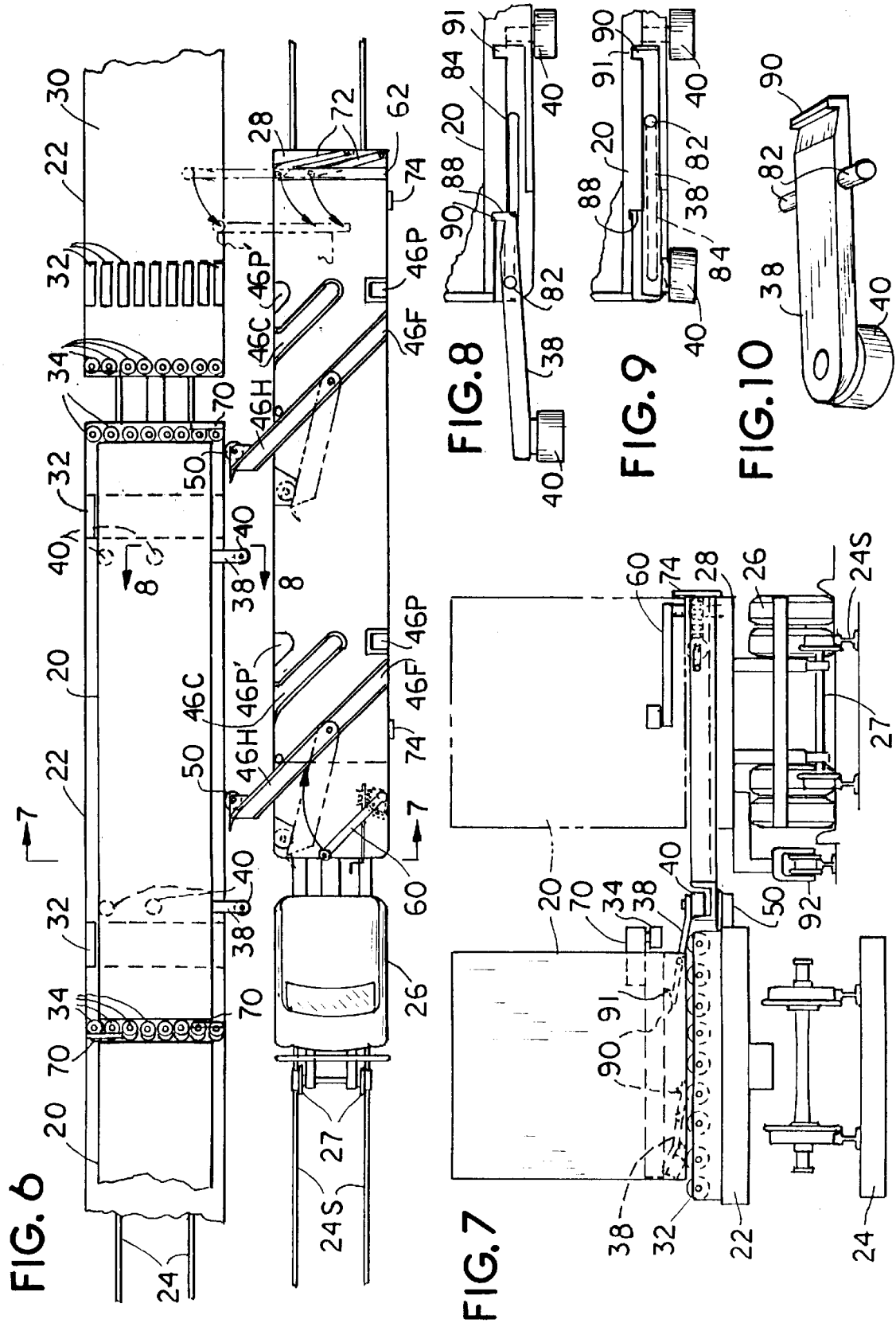

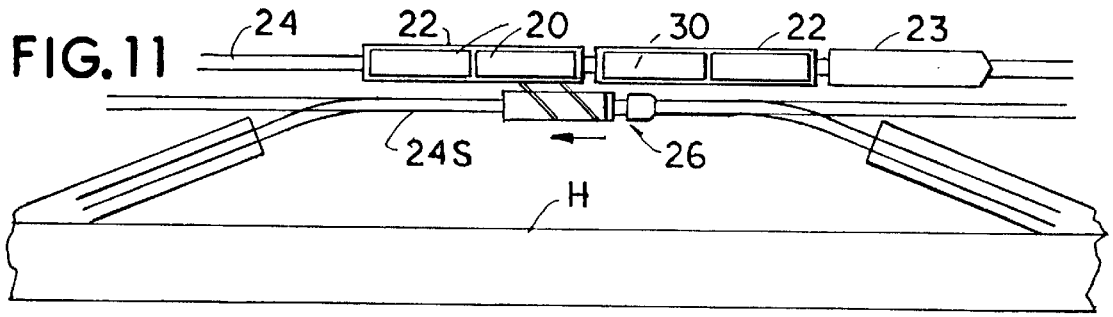
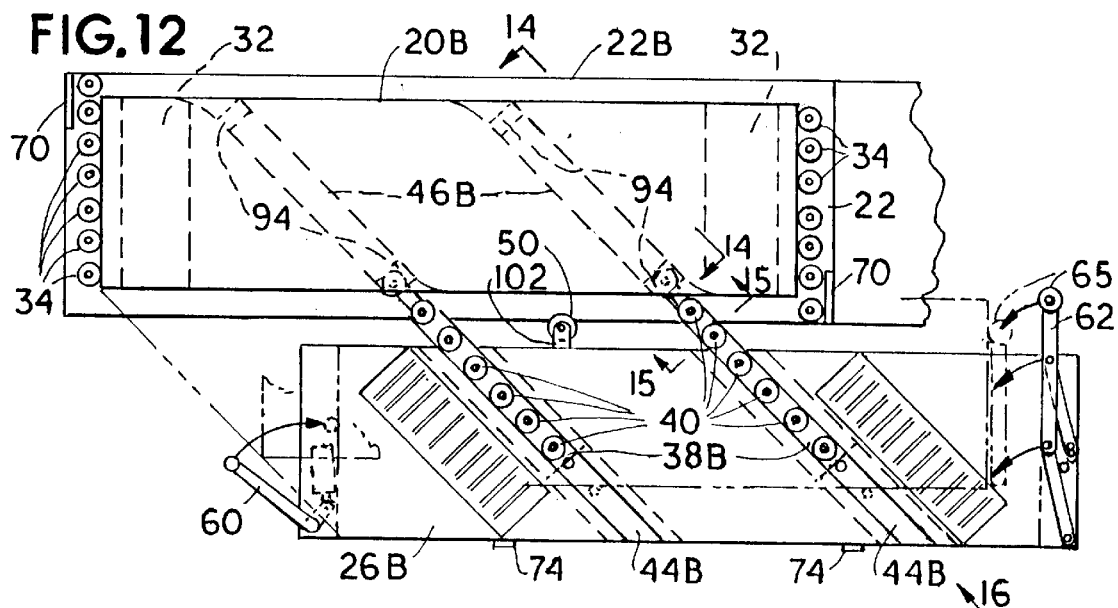
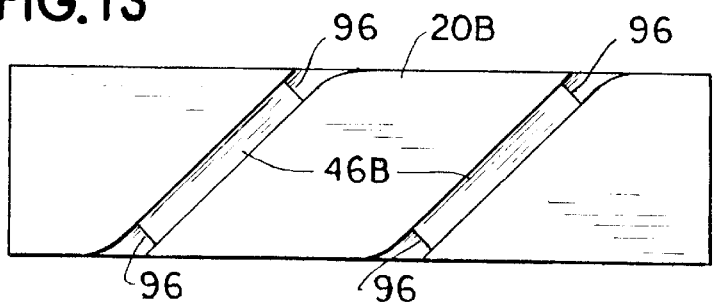
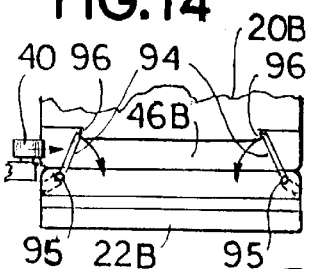
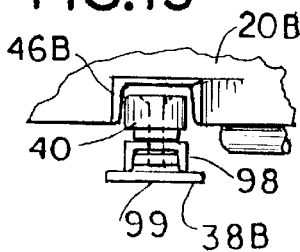
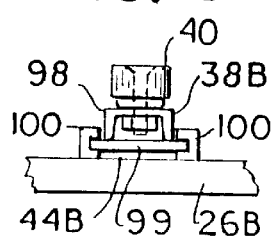
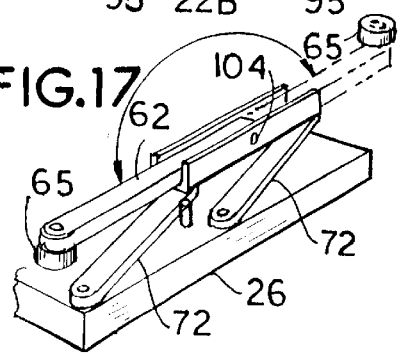

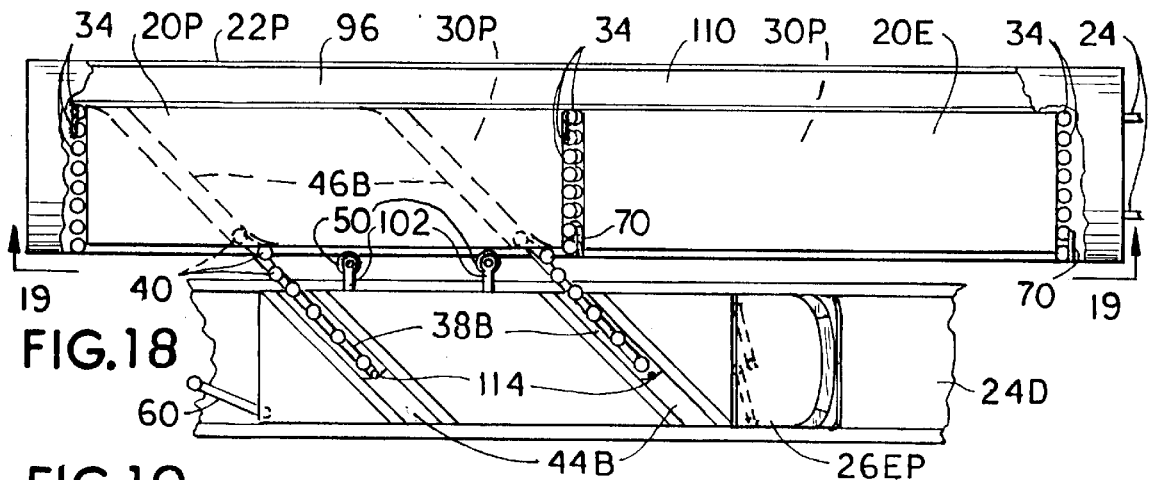
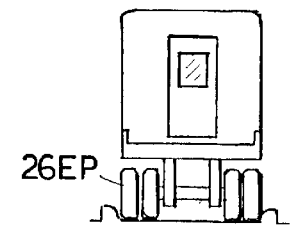
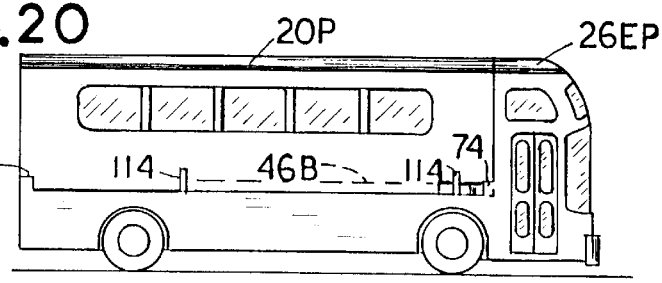
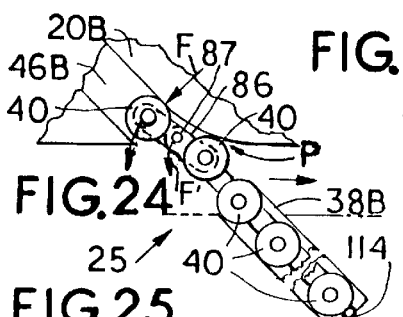
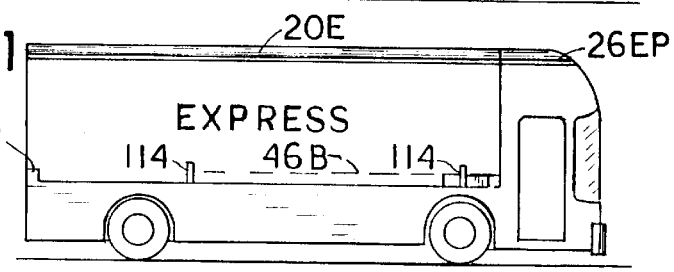
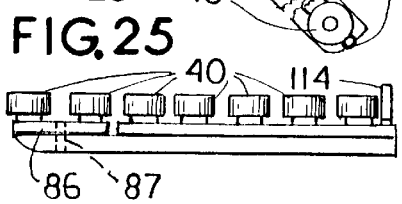
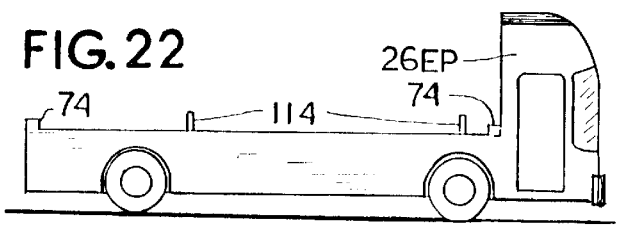

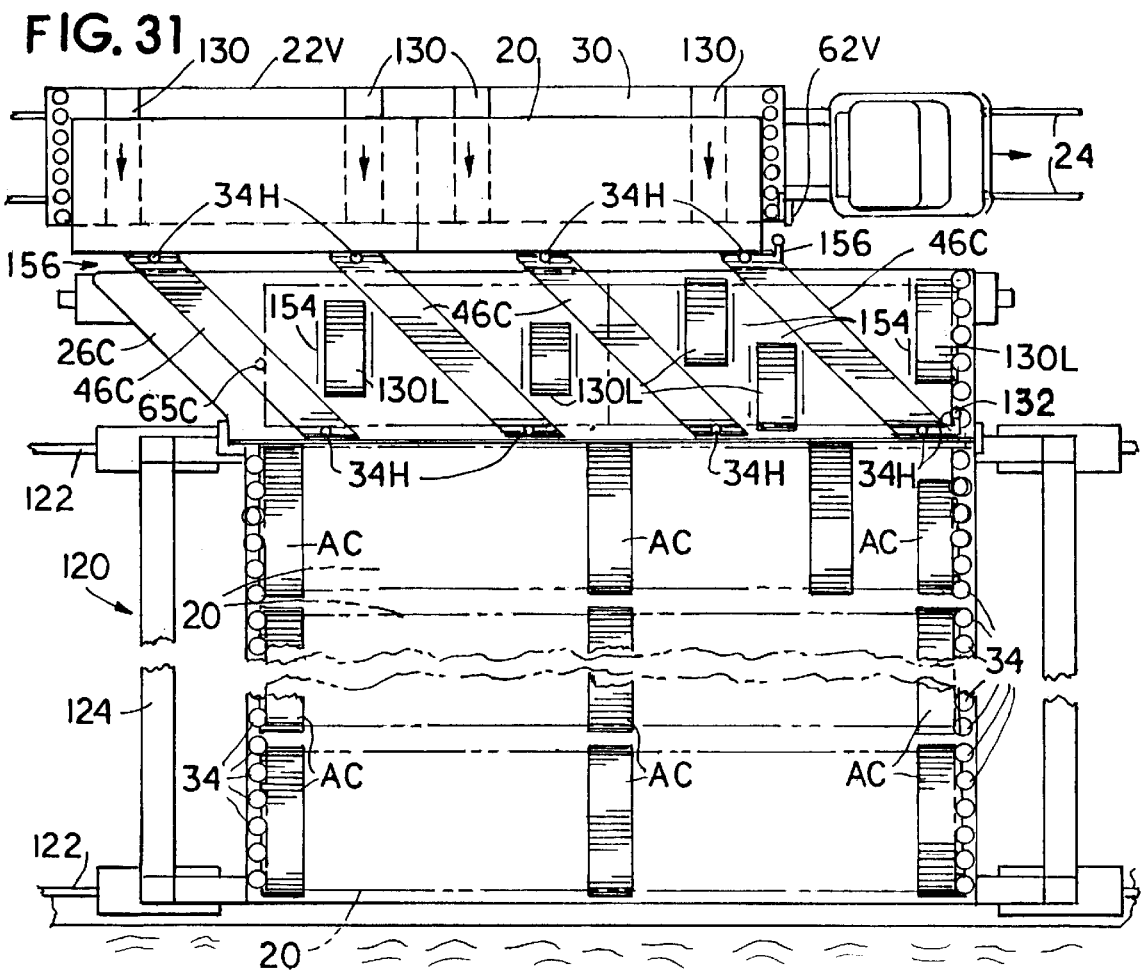
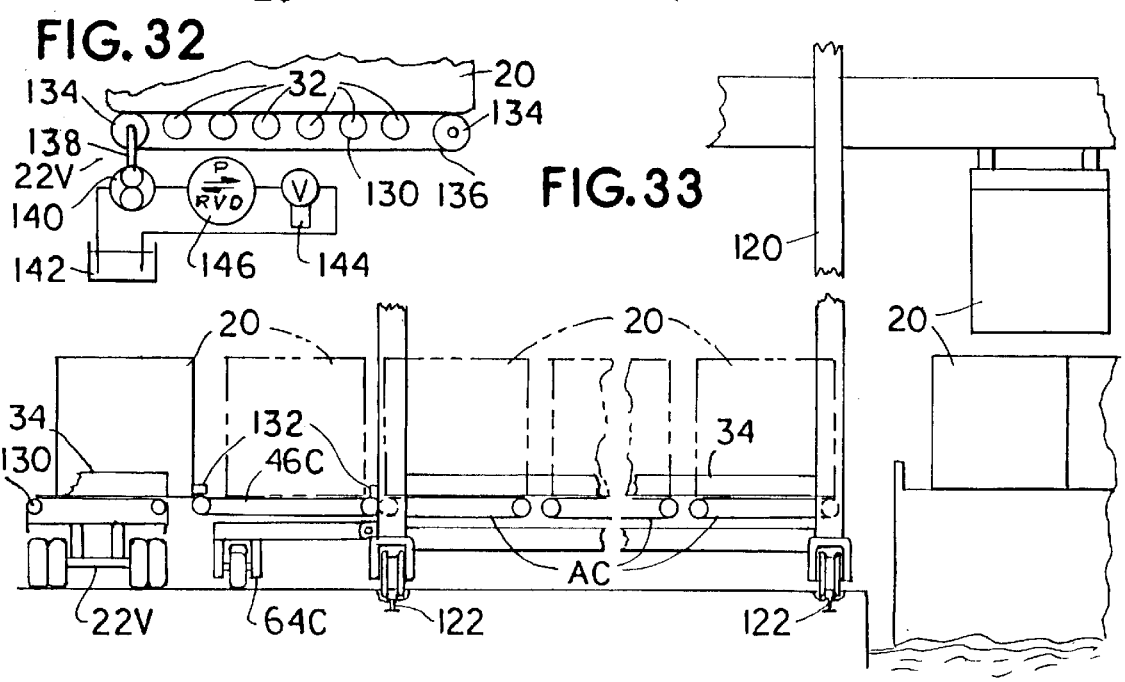

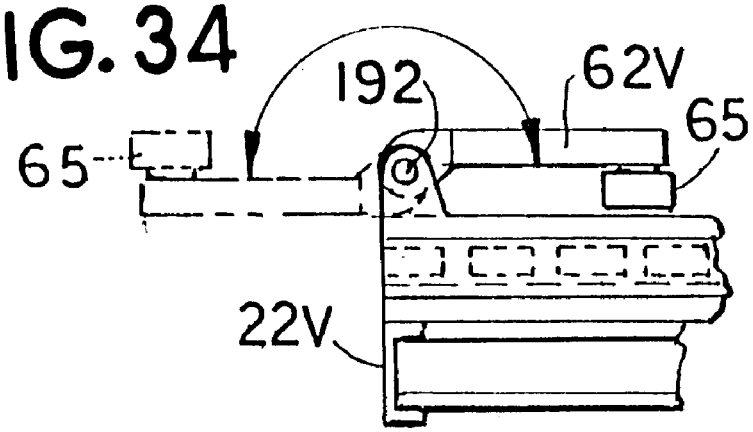

CONTAINER DRIVE-BY-TRANSFER AND SYSTEM

This invention is a continuation-in-part of my pending PCT Application Ser. No. PCT/US00/03400 filed Feb. 9, 2000, titled CONTAINER OBLIQUE-CHANNEL TRANSFER AND SYSTEM, and is a continuation of my U.S. Provisional Application U.S. Serial No. 60/233,186 filed Sep. 15, 2000 and Ser. No. 60/278,224 filed Mar. 23, 2001 for CONTAINER DRIVE-BY-TRANSFER AND SYSTEM.

In FIG. 34 of that pending PCT application dock car 26V is now replaced by a hi-rail tractor-trailer or truck or bus chassis with cab, and the semitrailer 22T is now replaced by a dock or standing railway car.

It is an object to provide a loader and system as in my pending PCT application where the oblique transfer channels are on a semitrailer or vehicle for side transfer of containers to or from a standing railway car, vehicle or dock or dock crane.

It is an object to stop the most massive vehicle for transfer. If the train is standing and a relatively light weight vehicle is moved by it for transfer there is less likelihood to damage the container if it gets stuck during transfer.

It is an object to provide a side roll-on-off container loader on a vehicle such as a semitrailer which can be driven along side of a dock or standing train car to transfer one or more containers to or from the standing railway car or dock.

It is an object to provide a tractor-trailer with retractable rail wheels and a parallel second track along a railway with road access for the tractor-trailer to be driven on and off the second track, the trailer having retractable oblique parallel channels for engaging a container to transfer it to or from a standing rail car or dock.

It is an object to provide a simple and low cost container transfer system for transferring one or more containers to and from a train stopped along a second parallel track having road access for truck mounted loaders.

It is an object to quickly transfer containers to and from the train or dock by driving by aligning and transferring while driving.

A further object is to eliminate any arms extended beyond the sides of the railroad car or the container which must be extended or retracted or removed. To provide instead transfer arms extended from the trailer, truck or bus chassis only. Preferably to have these arms brace or embrace the railway car from the trailer, truck or bus chassis while rolling or sliding along the railway car or dock to prevent tilting of the vehicles toward each other or toward the dock during transfer helping to support the container during transfer.

It is an object to provide improved means to initiate and to complete transfer. It is an object to provide levers to disengage transfer arms from transfer channels on containers.

It is an object to provide a vehicle chassis for transport and transfer of a bus or cargo container interchangeably to and from the train or dock.

It is a further object to provide such a transfer system suitable for ISO containers with no change or addition to the container.

It is an object to provide these container transfer and accumulating conveyors for mounting on a dock crane.

It is another object to eliminate the need for expensive terminal paving and equipment (including switch engines) by using highway trucks with rail wheels added to run on a track along side of container cars for transfer of containers to and from to directly load and unload the cars and reduce double handling by not setting containers on the ground where possible.

This system also is suited for transfer of containers at remote locations and industries saving long hauls to and from hub centers.

These, other and further objects and features should become evident to those skilled in the art by study of this application with reference to the drawings wherein:

FIG. 1 is a plan view of a container oblique-channel transfer trailer and tractor with added rail wheels on a track spaced parallel a track with train stopped for transfer of a container to the trailer.

FIG. 2 is a side elevation of the tractor-trailer of FIG. 1 with the container in phantom.

FIG. 3 is a plan view of a portion of a transfer channel extended from the trailer to engage a transfer cam roller on the container.

FIG. 4 is an end view of a roller channel in its track on the trailer in direction 4 of FIG. 1.

FIG. 5 is a side view of the roller channel in direction 5 of FIG. 1.

FIG. 6 is a plan view of a variation of the tractor-trailer on a track ready to move to the left to transfer a container from a car in a train stopped on a parallel track.

FIG. 7 is an elevation view on line 7—7 of FIG. 6 to larger scale.

FIGS. 8 and 9 are sectional views on lines 8—8 of FIG. 6 showing a transfer cam roller arm on the container respectively extended and retracted.

FIG. 10 is a perspective view of the transfer cam roller arm.

FIG. 11 is a plan view of a transfer staging area or station along a highway and railway with tractor-trailer for transferring a cargo container to or from the standing train.

FIG. 12 is a plan view of a variation of the transfer system of FIGS. 1 and 6.

FIG. 13 is an aligned bottom view of the container in FIG. 12.

FIG. 14 is an oblique section on line 14—14 of FIG. 12.

FIG. 15 is a view on line 15—15 of FIG. 12.

FIG. 16 is a view on line 16 of FIG. 12.

FIG. 17 is a perspective view of a push arm on the highway vehicle.

FIG. 18 is a plan view of a driveway with truck-bus chassis having transfer arms extended to a container on a railway car on a parallel track.

FIG. 19 is a side view of the car of FIG. 18 with a passenger and an express container therein.

FIGS. 20, 21 and 22 are side elevations of the truck-bus chassis with respectively the passenger container, the express container, and empty.

FIG. 23 is a rear view of FIGS. 20, 21 and 22.

FIG. 24 is a detail plan view of the end of a transfer arm engaging in a channel on a container of FIGS. 12–23.

FIG. 25 is a view on line 25 of FIG. 24.

FIG. 31 is a plan view of a tractor-trailer delivering a container to accumulating conveyors on the base of a dock crane.

FIG. 32 is a cross section of the vehicle bed with schematic controls.

FIG. 33 is an elevation view in direction 33—33 of FIG. 31.

FIG. 34 is a side view of a push arm on the end of a vehicle.

Figure 26:
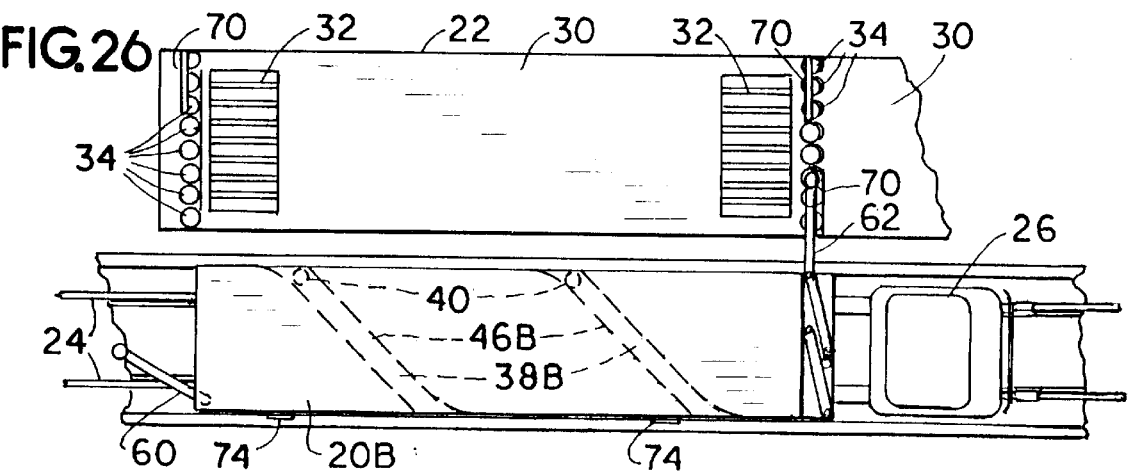
FIG. 26 is a plan view of the trailer of FIG. 12 engaging to transfer a container to the railway car by driving to the right.

Referring to the drawings and in particular to FIGS. 1 and 2, cargo container 20 on car 22 in train 23 is shown stopped on track 24 along a parallel spaced track 24S having highway M access for hi-rail tractor-trailer 26 with rail wheels 27 put down to engage and run on track 24S. The trailer has an oblique roller channel bed, platform 28, to transfer the container to and from the train or other stationary vehicle or dock.

Car 22, as in my pending application, has a roller bed, berth 30, with rollers 32 run lengthwise to support container 20 to roll in and out of the car transversely. The car also has the guide rollers 34 mounted in a curb across the car at each end of the container berth to longitudinally guide the container in and out from either side of the car.

Container 20 again has cam roller arms 38 mounted to slide in and out at the bottom, one spaced equally in from each end along each side to extend out for transfer and in for clearance. Each arm 38 has a cam roller 40 on a shaft 42 depending from the outer end of the arm. Another roller 40 is mounted on a shaft 42 secured depending from the bottom of the container in line and central between the sides of the container. Rollers 40 are thus three in line across each end of the container. These six rollers 40 on each container 20 are preferably in open space below the container on car 22 but engage in channels or pockets on the semitrailer bed 28. They could guide in channels across the berth of the car as an alternative to curb rollers 34.

Trailer bed 28 has two diagonal parallel guide tracks 44 each at 45° (20–50°) supporting an extendable channel 46, legs up, connected by air cylinder 48 to extend and retract from the far side of the trailer facing the train. That end of each channel 46 is cut at an angle approximately a right angle to the side of the trailer to be open to engage a roller 40 on an extended arm 38 so when the trailer is driven to the left rollers 40 extended from the side of the container engage in channels 46 and draw the container straight from the side of the car onto platform 28. Parallel center channels 46C run at 45° from the far side (train side) to the center line of the trailer to guide the center rollers 40 to the center of the bed to align the container transversely and longitudinally on the trailer. Pocket recess channels 46P and 46P' locate the rollers 40 under respectively the near and far sides of the container. Pockets 46P have sides at right angles to the trailer length that secure the near rollers 40 lengthwise to the trailer when the near side arms are retracted under the container securing it to the trailer. A roller 50 is mounted out below the end of each channel 46 to prevent scraping the side of the car and also to embrace the trailer against the car to prevent tipping during transfer of the container.

Referring to FIGS. 3–5 for details of channel 46 supported to roll out and in on channel ways 44. Each channel 46 has stub shafts 52 secured extending straight from each side leg each with three rollers that turn separately on the shaft, a load support roller 54 between a smaller roller 56 on each side supported on wear strips 57 along its track 44. Rollers 54 have a diameter to extend above channel 46 to engage the flat bottom of the container or a diagonal track on the container to support the container to roll parallel diagonally on bed 28. The outer rollers 56 along each channel 46 are covered by inward extending lips 58 along ways 44 to retain channels 46 from lifting off of track 44.

A cylinder 48 is parallel below each channel 46 connected between the channel and the platform 28 and operated by air supplied by the tractor through a valve controlled by the truck driver. Cylinders 48 are pressured to extend channels 46 out to where rollers 50 engage the side of the car bed and where channels 46 align with rollers 40 when extended on arms 38 from under a container.

The trailer has a push-on arm 60 at the entry-exit end and a push-off arm 62 at the stop end to push the container to respectively complete and initiate transfer onto and off from the trailer.

Push-on arm 60 is pivoted at 64 to swing endward the trailer to clear the container for transfer off or on and has a roller 65 at its outer end to engage the container to push it onto the truck after curb rollers 34 push it out from the car when the truck is driven to the left (FIG. 1). Arm 60 is operated by a gear segment 68 about its pivot. Segment 68 is engaging worm 69 turned by a hand crank or motor.

Push-off arm 62 is extendable to align to engage a tab 70 on the car and is supported on horizontal parallel linkage arms 72 to swing back with one or more rollers 65 to push the container out to the car when the truck is moved to the right as will be explained in more detail. A tab 70 is secured above end curb rollers 34 at the right-hand end of each berth of the car to align rollers 65 on arm 62 with the curb rollers 34 until the container engages the curb rollers to continue transfer of the container from the truck backing to the right.

Side tabs 74 on the trailer's near side and the push-off arm 62 are stops which hold the container from overtravel on the truck. The push-on arm 60 is turned against the end of the container to complete transfer onto the truck and with help of rollers 40 hold it in place against stops 62 and 74 to secure it horizontally.

VARIATIONS

Referring to FIGS. 6–10 for a variation of the trailer where the two parallel oblique channels 46 are each replaced by a channel 46H having one end pivotally mounted legs up to the bed of the trailer to swing horizontally from within the clearance plan outline of the trailer out to the side of car 22 and spaced apart to simultaneously engage rollers 40 on extended arms 38. Channels 46H need not extend all the way across the trailer as a pivoted member but are shown each with a near end continuing length 46F fixed to the trailer bed legs up in alignment with channels 46H when extended for rollers 40 on extended arms 38 to be guided across the trailer bed and out from the near side. The centering and notch channels are the same as in FIG. 1.

Centering channels 46C again guide center rollers 40 of the container on the platform to center. Notch channels 46P' pocket the far side rollers 40 when the container is aligned. Then notch channels 46P pocket the near side rollers 40 when recessed back under their container to secure on the trailer. Rollers 80 at right angles to the side legs of channels 46H and 46C support the container on the platform 26 to roll on and off. Tabs 74 prevent overtravel. Further securement is advised for highway travel.

Arm 38 can be as in FIGS. 8–10. This arm is mounted on trunnion pin 82 that slides in slot 84 along each side of the arm pocket in the container. When arm 38 is extended the weight of roller 40 causes it to drop into a catch 88 at the end of travel along slots 84 to hold the arm extended. Arm 38 is lifted and shoved in as shown in FIG. 9. The arm is held in by its tab 90 engaging in a pocket 91 in the bottom of the container and held extended by tab 90 engaging in catch 88.

The trailer and cars can have out outrigger wheels 92 for running on side support rails, or preferably wheels 50 brace the trailer against the car. Wheels 50 are flanged to bear along the platform.

Refer to FIG. 11 for a preferred station or transfer run along a highway H and tracks 24 and 24S. Ends of the transfer run track 24S turn away from track 24 toward the highway and are in pavement to help the tractor-trailer align for engaging track 24S. The truck driver can be in radio communication with the train engineer to have the train stop with an empty berth and/or container for the truck along this stretch of parallel tracks.

To deliver a container to the train, the train is stopped with an empty berth along parallel tracks 24 and 24S. The truck driver drives the trailer ahead of alignment with the berth, extends channels 46 or 46H and arms 60 and 62 and arms 38 on the near side of the container and unlocks it from the trailer. The driver then backs the trailer so when the arm 62 engages tab 70 on the car's arm 62 and then rollers 34 push the container along channels 46 or 46H off of the trailer onto the berth where it is latched down as described in my pending application. The driver lifts and pushes arms 38 in under the container and retracts channels 46 or 46H before driving away.

To transfer a container 20 to the truck the driver extends arms 60 and 38 a few feet before aligning the container as shown in FIGS. 1 and 6 and drives forward (to the left) engaging end rollers 40 on arms 38 into the channels 46 or 46H pulling the container onto the trailer bed. Arm 60 is retracted pushing the container against stops 62 and 74. Arms 38 are lifted and shoved in under the container in place on the trailer bed and the container is secured.

Referring to FIGS. 12–16 for a variation of the container and trailer bed using the same car 22 as described. The bed of truck 26B has one or more oblique parallel channelways 44B extending across it each supporting an arm 38B mounted to slide or roll along the channelway 44B. Each arm 38B has a row of rollers 40 aligned to revolve on upstanding pins 42B secured to the arm. The container bottom is flat with corresponding recessed channels 46B for rollers 40 to guide in to pull the container straight off the side of the car when the trailer is driven to the left. Obtuse ends of channels 46B are rounded wide for entry of rollers 40.

Arms 38B would bind after depositing a container on the car except they are pushed out of the ends of channels 46B by the lever arrangement of FIGS. 12, 24 and 25 where the end roller 40 is replaced by a lever bar 86 having a roller 40 at each end and centrally pivoted on vertical pin 87 to the end of arm 38B. As seen in FIG. 24 the lever pivots at P. Applying a force in the direction F on the lead roller 40 rotates the lever about P driving pin 87 in the direction of arrow F' to clear arm 38B from the channel 46B.

Referring to FIGS. 12–14 car 22B has container latch bars 94 pivoted at 95 and weighted to lift into recesses 96 in channels 46B. When a roller 40 engages against the latch bar the bar is pushed down to release the container to be pulled out from that side of the car.

Referring to FIGS. 12, 15, and 16, arms 38B are of hat-shaped section with a channel 98 turned down central along the top of flat 99 and rollers 40 on vertical pins 42 in line along the top to extend into channels 46B. Side channels 100 cover around the side edges of flats 99 to guide the arm in and out. An air cylinder 48 is connected rod end to each arm and head end to the truck bed parallel under each channel 44B to extend and return arms 38B between its travel limits. Arms 38B are fully extended in FIG. 12. A bracing arm 102 with wheel 50 is also extended by air whenever arms 38B are extended to roll against the side of the car to prevent tipping of the car and trailer.

FIG. 17 shows a push-off arm 62 having an extension arm pivoted at 104 to swing up and over to extend to the car for pushing a container out to engage the car 22. This extension would be swung up and over by the driver and would not slide out while driving.

Referring to FIGS. 18–23, a passenger railway car 22P on track 24 has two berths 30P for containers 20E or 20P respectively for express and passengers along one side and a partition and aisle 110 along the other side. A truck-bus chassis 26EP with cab has a container transfer bed 26B with two oblique channels 44B with arms 38B extended engaging in bottom channels 46B of container 20P. The chassis is backed along driveway 24D parallel track 24 to engage the container channels as shown and removes the container to the chassis as it is backed further to the left. Arm 60 completes the transfer. Arm 62 is extended to transfer the container from the chassis to the berth as described with FIG. 12. As shown in FIGS. 20–23, the chassis can handle either the express or passenger container.

Referring to FIGS. 24 and 25, transfer arm 38B is moving to the right leaving a container channel 46B. Its lever arm 86 sets up forces shown by arrows as explained causing the arm to be forced out of the channel rather than binding if only one roller 40 was on pin 87. The transfer arm 38B has a vertical push pin 114 extending up from its near side to follow the container out and pushes the arms back into the chassis with the container.

Figure 27:
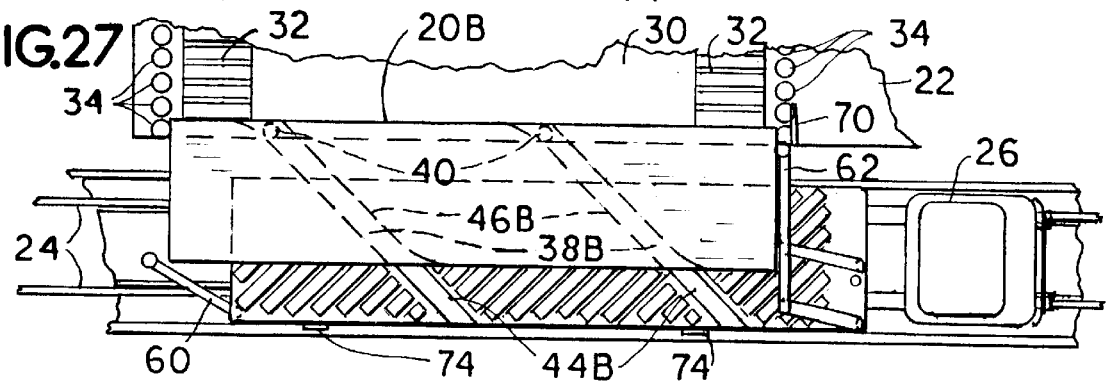
FIG. 27 is a plan view of FIG. 26 when the trailer is moving the container to the car.
Figure 28:
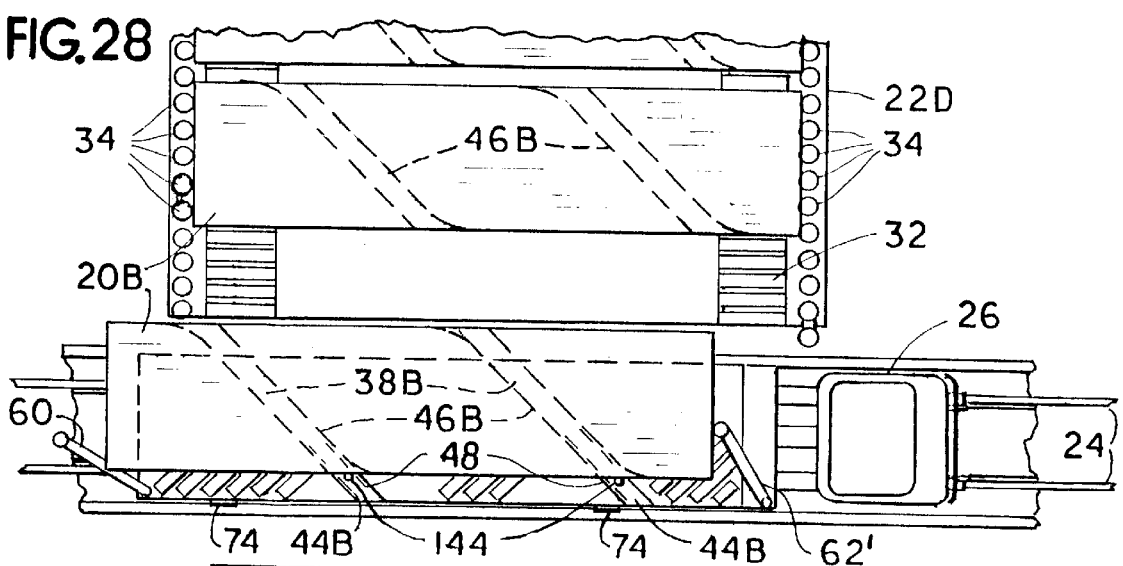
FIG. 28 is a plan view of a tractor-trailer driving to the right with a container pre-extended to transfer to a dock when driven against curb rollers on the dock.

Referring to FIGS. 26–28 for operations of this transfer system: To transfer a container from truck 26 arms 60 and 62 are extended from truck 26 driving to the right. Arm 62 is extended within the length of berth 30 to engage tab 70 when aligned as in FIG. 26 moving arm 62 back forcing the container back and out along channels 44B to the position shown in FIG. 27 where the container engages between curb rollers 34 at opposite ends of the berth just before arm 62 leaves tab 70. Continued driving to the right rolls the container fully into the berth where arms 38B leave channels 46B and latches 90 secure the container on the car. Arms 36B and 60 are retracted.

To transfer the container from car 22 to the truck arms 60 and 38B are extended to the right of alignment with container, and the truck is backed up, engaging the end roller 40 on each arm 38B in channels 46B, unlatching the container and pulling it straight out from the side of the car until clear of the curb rollers 34 at the left end of the berth. Then arm 60 is retracted forcing the container to roll onto the truck's platform against side tabs 74 and stop arm 62. Arm 60 then holds the container in place but further securement is advised. Rollers 34 are clear above the path of arms 38B and arm 62 clears over rollers 34.

Referring to FIG. 28, replacing car 22 with a dock 22D, truck 26 is driving to the right with arm 60 extended and a container 20B partly extended from the side toward the dock (or other vehicle) by extending cylinders 48, extending arms 38B with push rods 114 pushing on the near side of the container and/or an off-loading arm 62' similar to arm 60 rotated backward. To push the container out along channels 46B to engage the leading corner of the container with the end curb rollers 34 on the right of dock 22D. As the truck moves further to the right the container is moved onto the dock and to clear extended arms 38B. It is carried back from there by accumulating conveyors.

Figure 29:
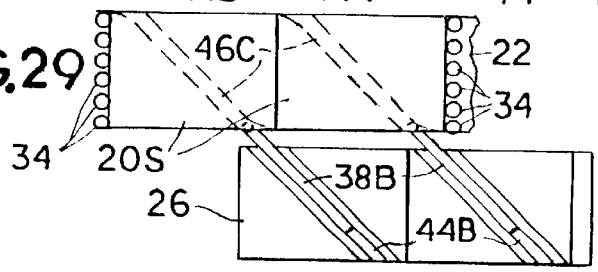
FIG. 29 is a schematic plan of short containers being transferred between a platform and a truck.
Figure 30:
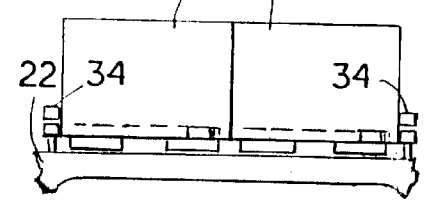
FIG. 30 is a side view of these containers on the platform.

Referring to FIGS. 29 and 30, short containers 20S need only have one channel 46B each to keep aligned for transfer when transferred in twos.

Referring to FIGS. 31–33 where a preferred form of this invention is applied to a container dock crane: dock crane 120 on track 122 has accumulating conveyors AC supported on or within its base frame 124 and a transfer platform or apron 26C hinged to its base facing track 24 with car 22 or equivalent truck 22V having a container berth 30 the same as in FIGS. 1, 6, and 12 except conveyors 130 are added across the berth to move containers 20 out and on as restrained and aligned by a traveling locating bumper or hod 132 on apron 26C.

Conveyors 130 each have rollers 32 parallel the length of the trailer bed each with a sprocket 134 concentric thereon connected by a roller chain 136 driven and connected by shafting 138 to a hydraulic motor 140 to operate the conveyors in sync as one. Motor 140 is connected in a hydraulic circuit, FIG. 32, including from tank 142, solenoid valve 144, a reversible variable delivery pump 146, hydraulic motor 140, to tank 142. Valve 144 is controlled by the driver and a proximity sensor located to detect that the trailer is positioned H along side of apron 26C.

This apron platform 26C has four diagonal slat conveyors 46C coordinated to work as one to transfer a full length or two half-length containers together and a plurality of transversely arranged straight lift conveyors 130L to move the containers between the platform 26C and the accumulating conveyors AC. Curb rollers 34 are the right-hand end stops and help keep the containers parallel and in line traveling on the accumulating conveyors. Conveyors AC are each in length a container width plus clearance and controlled to feed the containers side-by-side from the boat side of the crane to reduce the distance the crane needs to move for each transfer to or from the ship. Conveyors 130L on the apron platform are each on an air bag 154 connected to lift together to move the container between the accumulating conveyors and the apron and lowered to set the container on the diagonal conveyors 46C for transfer between vehicle 22V and the platform apron.

Diagonal conveyors 46C together carry two hods 132 over a container width apart, each being a row of rollers 34H, each roller secured to turn on a pin on a flat or slat in a row across the conveyors parallel vehicle 22V to engage the side of the container and an end stop roller 34H on the slat 158 positioned for the right-hand end of the container to locate against. Rollers 34H hold the container from moving off vehicle 22V until driven to the right, moving the container along rollers 34H until it hits the end stop roller 34H and then moving the container off of the vehicle aligned by this hod traveling along the oblique channels conveyor 46C until off of vehicle 22V when conveyors 46C are supporting the container and powered to move it against stop rollers 34H. Further movement of conveyor 46C carries the hod out of the way around end sprockets.

Referring to FIGS. 31 and 34, vehicle 22V has a push arm 62V at each corner of its bed. Arm 62V is pivotally mounted on pin 192 to swing up over and out extendable as shown in phantom by a operator to engage a container to align it with curb rollers 34 to push the container from the platform into the container berth on the vehicle when moving to the left. The hod has a pressure sensitive limit switch at the right-hand end roller 34H that senses movement of the container away from the roller to power conveyors 46C to keep up with the container and move it parallel onto vehicle 22V between curb rollers 34.

To deliver a container to the platform, conveyor 46C is stopped as shown in FIG. 31 for hod rollers 34H to form a stop against which the container is to be held. The container is released and conveyors 130L operated together by the truck operator to extend the container against hod rollers 34H to the position shown in FIG. 31. Then when vehicle 22V is driven to the right the right-hand end roller 34HE on the hod is soon engaged starting conveyors 46C. Conveyors 130 on the vehicle bed can now push the container out against the hod as it travels away from vehicle 22V along its oblique tracks, moving the container out from the vehicle onto conveyors 46C as driven by the hod, pushed by the container, pushed by the curb rollers 34 at the rear of the vehicle as it is driven to the right. When the container is pushed onto conveyor 46C and freed from vehicle 22V conveyor 46C is turned on to continue the movement until the container strikes curb rollers 34 at the right end of the platform where the container is aligned with the accumulating conveyor and the hod retracts around end sprockets. Air bags 154 under conveyors 130L are lifted and conveyors 130L move the container onto the accumulating conveyors. Alternately a push arm 60 with roller 65C on the platform 26C could be used to complete the transfer.

Backup roller 65C secured on a slat 158 engages the left end of the container to push the container onto the platform and moves conveyors 46C when transferring to the vehicle.

To receive a container from platform 26C, vehicle 22V is moved or driven right to left, turned around or backed up. The hod along the inner end of the apron by its hinge is cleared below for a container to be moved from the accumulating conveyors into position shown in phantom, FIG. 31. The hod is moved diagonally to the left to move the container toward the side of vehicle 22V. Push arm 140 is extended from the side of the vehicle to engage the container and move it and roller 65C which moves conveyors 46C and the hod in alignment with the berth to position the container on the vehicle. Transverse conveyors 130 on the vehicle help carry the container into position and the container is secured.

Vehicle 22 or 22V can be guided by steel faced curbs along a driveway instead of rail wheels.

Having thus described my invention with some useful embodiments, I intend to cover by claims to be submitted all embodiments, variations, applications, and parts which are within the true spirit and scope of this invention.

I claim as my invention:

1. A drive-by container transfer system comprising in combination: a transport container, a platform therefor, having at least one substantially straight transfer side and conveying means for conveying said container at right angles straight to said side for transfer onto and off from said platform, a driveway spaced parallel to and along said transfer side, a vehicle for driving along said driveway and having a bed for supporting said container wits sides parallel said transfer side, conveying means secured at an oblique angle across on said bed and means thereon extendible to engage said container when on said platform to transfer it parallelly on to oblique angle on staid bed and straight on said platform and guide said container parallelly between (to or from) said platform and said vehicle according to the direction of movement of said vehicle along said transfer side of said platform and operated by that movement.

2. A container transfer system including in combination: a transport container, a bed and a platform each for said container and each having an adjacent side, a vehicle having said bed thereon parallel along said adjacent side of said platform for parallel transfer of said container therebetween, interfitting cam track means on both said container and said bed running at an oblique angle across said bed and extendible out along said adjacent side for aligning and engaging said container to be moved parallel along said oblique angle while said vehicle moves parallel to said adjacent side in a first direction, said platform having conveying means for moving said container straight onto and from said adjacent side parallel thereto, and locating push means for engaging said container with said platform to transfer said container to said platform when said bed is moved parallel along said adjacent side in the opposite direction.

3. A system as in claim 1, a first railway track a railway car sitting thereon, said driveway including a second railway a track parallel and spaced aways along said first railway track, said platform being a berth for said container on said car, said vehicle being a tractor-trailer (semitrailer) having HI rail wheels on said second track, to drive-by said railway car for transfer of said container.

4. A system as in claim 2, there being at least two said containers one for passengers and one for cargo, said vehicle being a highway bus-truck chassis and cab with said bed for haul of a both said containers one at a time on said bed.

5. A system as in claim 2, said interfitting cam track means including a plurality of extendable and retractable channels hiving upturned sides, said container having extendable and retractable arms, a roller on the end of each of said arms depending therefrom and aligned when the arm is extended to engage in a said channel when also extended to draw said container from said platform to said bed when there is relative movement parallel between said bed and platform in the direction the channels are pointing.

6. A system as in claim 2, said interfitting cam track means including a plurality of channelways secured at the oblique angle spaced apart and secured across on said bed, a roller track arm with cam rollers spaced along the top is supported to travel along each of said channelways to each extend a distance from said side of said bed, means for extending and retracting said track arms, said container having corresponding channels run legs down at the oblique angle across the bottom of the container each to align with said cam rollers on a said track arm whereby said cam rollers can be pushed into to enter said channels on said container to draw said container onto said bed when said vehicle is moved alongside said straight transfer side in the direction of said cam rollers entering said channels on said container.

7. A system as in claim 6, each of said track arms having a lever centrally pivoted to its outer end (engaging end) with one of said rollers on each end to direct disengaging force lengthwise said arm.

8. A system as in claim 6, means for extending and retracting each said track arm, means on said bed for pushing said container fully onto said platform, find push means extendable between said bed and platform to move said container out to engage for transfer.

9. A container as in claim 6 having a flat bottom, said corresponding channels being recessed flush therein thereacross, the legs of these channels flaring out at the obtuse angles to blend into the side edges of the container for said cam rollers to enter and exit said channels.

10. A system as in claim 2, said bed having at least one bridging arm with wheel for extending out to roll against the side of said platform to stabilize from tipping during transfer of said container.

11. A system as in claim 2, said bed being on a highway vehicle.

12. A system as in claim 2 said interfitting cam track means being a channel on said bed and cam rollers on said container to align in said channel.

13. In a system as in claim 12, said channel hiving a telescoping end extension to extend out to engage said container.

14. In a system as in claim 13, a guide roller on the bottom of each extension to gage and braces toe extension against the platform.

15. In a system as in claim 12, said channel having an extension mounted on said bed to swing out and in horizontally to align with said channel and having its outer end shaped to scoop in said cam rollers.

* * * * *

UNITED STATES PATENT AND TRADEMARK OFFICE
CERTIFICATE OF CORRECTION

PATENT NO. : 6,695,561 B2
DATED : February 24, 2004
INVENTOR(S) : Leonard D. Barry It is certified that error appears in the above-identified patent and that said Letters Patent is hereby corrected as shown below:

Column 4,
Line 15, replace "there being" with -- therebeing --.

Column 7,
Line 20, replace "positioned H along" with -- positioned along --.

Column 8,
Line 54, replace "stain" with -- said --.

Column 10,
Line 10, replace "find" with -- and --.
Line 27, replace "hiving" with -- having --.
Line 31, replace "braces toe" with-- brace the --.

Signed and Sealed this

Twenty-second Day of March, 2005

JON W. DUDAS
*Director of the United States Patent and Trademark Office*